Figure 1:
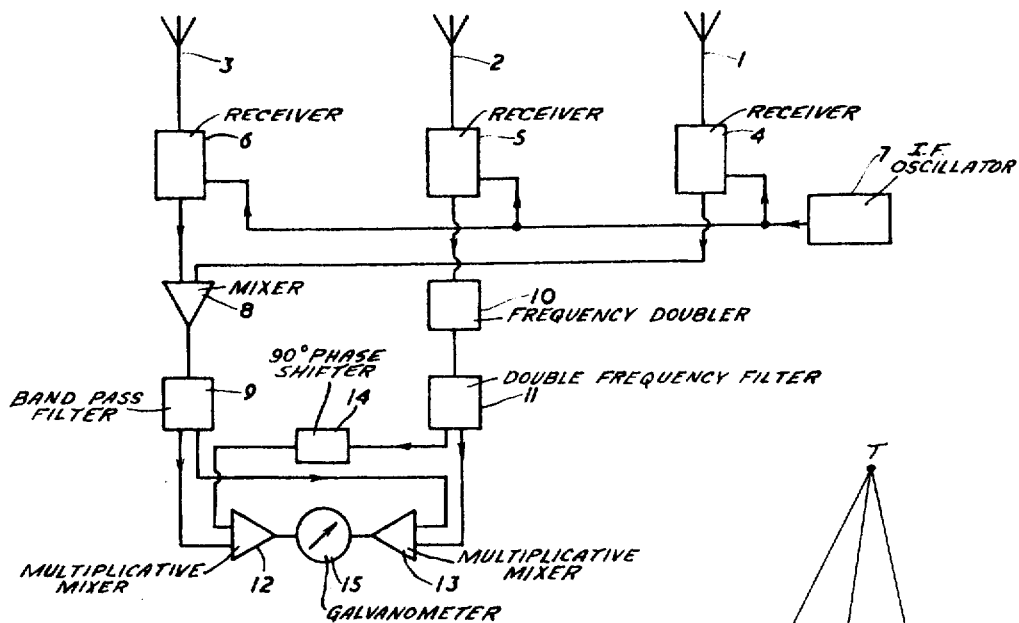

Aug. 23, 1966     C. D. COLCHESTER     3,268,895

RADIO RANGE FINDERS

Filed July 12, 1956

INVENTOR:
Christopher Hering Colchester
BY: Baldwin & Wight
ATTORNEYS

United States Patent Office 3,268,895
Patented August 23, 1966

3,268,895
RADIO RANGE FINDERS
Christopher Dering Colchester, Essex, England, assignor to The Marconi Company Limited, London, England, a British company
Filed July 12, 1956, Ser. No. 597,375
Claims priority, application Great Britain, July 13, 1955, 20,285/55
5 Claims. (Cl. 343—112)

This invention relates to radio range finders and has for its object to provide means suitable for shipboard use whereby the range of a radio energy source operating on very short wavelengths of the order of centimetric wavelengths may be ascertained with reasonable precision. The principal application of the invention is to the provision of shipboard radio range finders for the ascertainment of the range of short wave radio sources—usually noise sources—which are being employed to "jam" radar apparatus, but of course the invention is not limited to this particular application.

An important military requirement is that of ascertaining the position of very short wave hostile radio stations employed for the purpose of radar jamming. Basically it is of course possible to ascertain the position of such a jamming station by the method of simple triangulation using a direction finding receiver at each end of a baseline and determining the position of the jamming station by orientating the two receivers on it. If, however, the jamming station is a considerable distance away—for example, of the order one hundred miles or more—the baseline must obviously be a long one if reasonable accuracy is to be obtained by this method of triangulation even if the baseline is most advantageously situated, i.e. at right angles to the general direction of the jamming station.

In the case of a shipboard installation, although there is no difficulty in arranging the baseline at right angles to the general direction of the jamming station since the ship can be headed so as to be beam-on to the jamming station, the method of simple triangulation is unsatisfactory and ineffective since the maximum baseline available, which is the length of the ship, is much too small. The present invention seeks to overcome this difficulty and to provide a radio range finder suitable for use aboard ship and which will ascertain the range of a very short wave radio source with acceptable accuracy, despite the fact that there is no baseline available exceeding the length of the ship. It is believed that by means of the invention, it will be possible to design apparatus which can be carried on a ship of the order of a few hundred feet long, and which will be accurate enough to determine the range of a centimetric radio source at the order of a hundred miles or more distance (provided of course it is high enough to be received at all) with an accuracy of a few percent, by measuring the curvature of the wave front transmitted by the jamming station.

According to this invention, a radio range finder comprises an inner aerial and two outer aerials which are spaced apart; a mixer connected to combine signals derived from the two outer aerials to produce a signal of twice the frequency of that derived from said outer aerials; a frequency doubler connected and arranged to double the frequency of a similar frequency signal derived from the inner aerial; a multiplicative mixer or co-relation detector fed in phase with the doubled frequencies from said first mentioned mixer and from said frequency doubler; a further multiplicative mixer or co-relation detector fed with the doubled frequencies from said first mentioned mixer and from said frequency doubler in phase quadrature; and range indicating means responsive differentially to the outputs from the two multiplicative mixers or detectors.

Preferably the signals derived from the outer aerials and fed to the first mentioned mixer and the signals derived from the inner aerial and fed to the frequency doubler are intermediate frequency signals obtained by mixing local oscillations from a common oscillator with received signals in three receivers fed one from each aerial.

Figure 2:
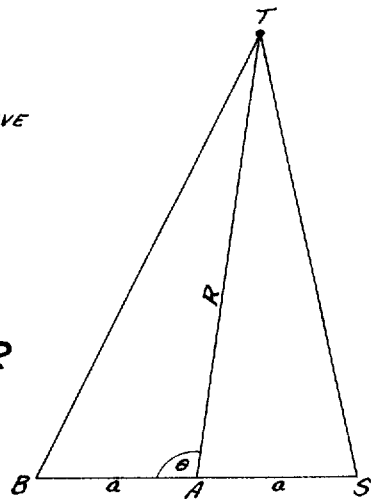

The invention is illustrated in the accompanying drawing in which FIGURE 1 shows in block diagrammatic form one embodiment thereof. FIGURE 2 is a geometrical diagram to illustrate mathematical calculations.

It is presumed that the illustrated embodiment is mounted on a ship. The said embodiment comprises three aerials, 1, 2 and 3 which are represented only as open aerials but are preferably directional aerials of separately orientable directivity. Aerial 1 is mounted in the bows, aerial 3 mounted in the stern and aerial 2 is mounted amidships. Each aerial feeds into its own receiver 4, 5 or 6, to which local oscillations from a common local oscillator 7 are fed so as to produce the same intermediate frequency output from all three receivers. The intermediate frequency outputs from the bow and stern receivers, 4 and 6 are fed to a mixer 8, the output of which is passed through a band-pass filter 9 adapted to pass twice the intermediate frequency. The corresponding output from the amidships receiver 5 is fed to a frequency doubler 10, the output of which is passed to a double frequency filter 11 corresponding to the filter 9. Filtered outputs from the two filters 9 and 11 are combined in two multiplicative mixers or co-relation detectors 12 and 13. As will be seen, each of the mixers 12, 13 receives two inputs, one from each of the filters 9 and 11. The two inputs to the mixer 13 are fed thereto without change of phase but one input to the mixer 12—as shown, that from the filter 11—is fed through a channel including a 90° phase shifter 14. Thus the input to mixer 12 from filter 11 is in phase quadrature with that fed from said filter to the mixer 13, whereas the two outputs taken from filter 9, one to mixer 12 and the other to mixer 13, are in phase. The outputs from the two mixers 12 and 13 are fed differentially to an indicating instrument, for example a tangent galvanometer 15 which can be calibrated to read range directly.

Suppose the phases of the signals from a given distant transmitter are $\varphi_1$, $\varphi_2$ and $\varphi_3$ respectively at the aerials 1, 2 and 3 and assume, as is arranged to be the case in practice, that no differential phase shifts (other than that introduced by the phase shifter 14) are introduced by the apparatus and connections of the shipboard installation. Then the corresponding phases of the outputs from the units 8 and 10 in the neighborhood of the double frequency will be respectively $(\varphi_1+\varphi_3)$ and $(2\varphi_2)$. Since the multiplicative mixers or co-relation detectors 12 and 13 are virtually quadrature phase and in-phase detectors respectively, the phase difference indicated by the instrument 15 will be $(\varphi_1+\varphi_3-2\varphi_2)$ and it can be shown that this expression is inversely proportional to the range of the target.

To provide an indication at the apparatus described the ship should be brought approximately beam-on to the jamming station so that the three aerials in line are approximately perpendicular to the wave front of the transmitted signal.

For example if the spacing between the inner aerial and each outer aerial is 150 feet, and the jamming station is operating on a wavelength of 10 cmc. then the indicated phase difference will be approximately 40 degrees for a range of 100 nautical miles, when the ship is beam-on to the jammer, this phase difference will change only slowly with change in the bearing of the jamming station relative to the ship.

The relationship between range and phase indication can be seen with reference to FIGURE 2 in which T is the jamming transmitter at range R at an angle $\theta$ relative to the fore and aft line of the ship. $2a$ is the total distance between the two outer aerials at B and S, A being the aerial amidships, length $a$ is very much less than R.

Distance $BT = \sqrt{a^2 + R^2 - 2\ aR\ \cos\ \theta}$ $ST = \sqrt{a^2 + R^2 + 2\ aR\ \cos\ \theta}$ The phase sum $\phi_1 + \phi_3 - 2\phi_2$ $= \frac{2\pi}{\lambda}\{\sqrt{a^2 + R^2 - 2\ aR\ \cos\ \theta} + \sqrt{a^2 + R^2 + 2aR\ \cos\ \theta} - 2R\}$ $= \frac{2\pi R}{\lambda}\left\{\sqrt{1 + \frac{a^2}{R^2} - \frac{2a}{R}\cos\theta} + \sqrt{1 + \frac{a^2}{R^2} + \frac{2a}{R}\cos\theta} - 2\right\}$ Since $a/R$ is very small and in a practical case can be neglected, the above expression can be expanded to give:

$\phi_1 + \phi_3 - 2\phi_2 = \frac{2\pi R}{\lambda}\left\{\frac{a^2}{R^2}(1 - \cos^2\theta\ \ldots\ldots\ldots)\right\}$ $= \frac{2\pi(a\ \sin\ \theta)^2}{R\lambda}$ radians in which $a \sin \theta$ is recognizable as the apparent base line from the direction of the target.

It is not essential that the three aerials should be exactly in line nor that the amidships aerial 2 should be midway between aerials 1 and 3 since it can be made possible to correct the range indication depending on the bearing of the target.

I claim:

1. A radio range finder comprising an inner aerial and two outer aerials which are spaced apart; a mixer connected to combine signals derived from the two outer aerials to produce a signal of twice the frequency of that derived from said outer aerials; a frequency doubler connected and arranged to double the frequency of a similar frequency signal derived from the inner aerial; a multiplicative mixer or co-relation detector fed in phase with the doubled frequencies from said first mentioned mixer and from said frequency doubler; a further multiplicative mixer or co-relation detector fed with the doubled frequencies from said first mentioned mixer and from said frequency doubler in phase quadrature; and range indicating means responsive differentially to the outputs from the two multiplicative mixers or detectors.

2. A radio range finder as claimed in claim 1 and wherein the signals derived from the outer aerials and fed to the first mentioned mixer and the signals derived from the inner aerial and fed to the frequency doubler are intermediate frequency signals obtained by mixing local oscillations from a common oscillator with received signals in three receivers fed one from each aerial.

3. A shipboard radio range finder as claimed in claim 1 wherein the outer aerials are mounted respectively in the bow and stern portions of a ship and the inner aerial is mounted amidships.

4. A radio range finder as claimed in claim 1 and wherein the aerials are directional aerials of orientable directivity.

5. A radio range finder comprising three spaced aerials; a heterodyne receiver fed from each aerial, said receivers having a common local oscillator source; a mixer fed with beat frequency signals from two of the receivers; a frequency doubler fed with beat frequency signals from the third receiver; two filters fed one from the frequency doubler and the other from said mixer, said filter being frequency selective to pass twice the intermediate frequency from the receivers; a multiplicative mixer or co-relation detector fed, without phase change, from the two filters; a further multiplicative mixer or co-relation detector fed without phase change from one filter and, through a 90° phase changer from the other; and an indicator fed differentially from the two multiplicative mixers or detectors.

References Cited by the Examiner
UNITED STATES PATENTS

| | | | |
|---|---|---|---|
| 2,533,499 | 12/1950 | Munson | 340—16 X |
| 2,592,459 | 4/1952 | Perilhon | 343—112 X |
| 2,760,190 | 8/1956 | Henrici | 343—112 X |

CHESTER L. JUSTUS, *Primary Examiner.*

NORMAN H. EVANS, *Examiner.*

J. E. BENOIT, R. E. BERGER, *Assistant Examiners.*